3,432,514
POLYOLEFIN COMPOSITIONS AND THEIR
PREPARATION
George O. Cash, Jr. and Frederick B. Joyner, Kingsport, Tenn., assignors to Eastman Kodak Company, Rochester, N.Y., a corporation of New Jersey
No Drawing. Filed Mar. 16, 1966, Ser. No. 534,636
U.S. Cl. 260—93.7
Int. Cl. C08f 47/00, 29/02, 1/88
6 Claims

ABSTRACT OF THE DISCLOSURE

Poly-alpha-olefin compositions having an improved crystalline structure with improved physical and optical properties are obtained by employing as crystallinity promoters a combination of certain metal alkoxides and certain organic carboxylic acids.

---

This application is a continuation-in-part of our application Ser. No. 405,586, filed Oct. 21, 1964.

This invention also relates to new poly-alpha-olefin compositions having improved crystalline structure resulting in greater clarity and improvements in other physical properties. In particular, this invention involves certain new crystallization promoters for accomplishing the foregoing.

As is already known in the industry, when a crystallizable polymer such as polyethylene or polypropylene cools from a melt, crystallization occurs. The rate of development of crystallinity is determined by the rate of formation of crystallization centers and the rate of growth of nuclei. The size of the crystallites depends on the rate of crystallization which depends in turn on the cooling rate and the number of nucleating particles present. Slow cooling and few nuclei favor the growth of relatively large crystallites. When light is passed through a specimen of such a polymer it becomes dispersed as it is reflected and refracted by spherulites (aggregates of crystallites) within the polymer. The polymer therefore appears white or translucent depending on the thickness of the specimen. If the polymer is quenched from the melt, rapid crystallization occurs with the formation of spherulites of such small dimensions that they do not interfere greatly with the passage of visible light. Such a quenched polymer, however, may have a low degree of crystallinity which deleteriously affects mechanical properties. If allowed to crystallize significantly, the spherulites grow in size and the polymer may lose its transparency.

In certain prior patents and publications, it has been proposed to promote relatively rapid crystallization to achieve small spherulite size and to provide high degrees of crystallization by the use of heterogeneous nucleating agents. For example, the crystallization rates of polyethylene and polypropylene have been increased by heterogeneous nucleating agents such as the metal salts of carboxylic and sulfonic acids. The rapid and high degree of crystallization induced by these prior art nucleating agents generally results in improved transparency of the polymer and improved mechanical properties. However, these prior art nucleating agents are difficult to disperse in the polymers and in some cases cause pigmentation rather than an improvement in polymer clarity.

In our parent application aforesaid we have disclosed nucleated polyolefin compositions which we believe represent an advance in the art. Based on extensive further investigations we have now discovered a new binary crystallization promoter which may be incorporated in polyolefin compositions in certain ways more readily and gives products with properties considerably improved over those heretofore obtainable.

This invention has for one object to provide new crystallization promoter combinations for improving the transparency and the like properties of crystallizable poly-alpha-olefins. Another object is to provide new crystallization promoters of the type indicated which can readily be dispersed in the poly-alpha-olefins to give substantially homogeneous formulations. Still another object is to provide new crystallization promoters for accelerating the crystallization of poly-alpha-olefins and reducing the size of spherulites while providing high degrees of crystallinity. Still another object is to provide new poly-alpha-olefin compositions having a high degree of crystallinity, excellent homogeneity, and improved clarity and other desirable properties. A particular object is to teach a special combination of a nematogenic carboxylic acid and a metal alkoxide uniquely useful for incorporating in polyolefin compositions. Other objects will appear hereinafter.

In the broader aspects of our invention we have found that a combination of a nematogenic carboxylic acid and a metal alkoxide, both showing transitions within a preferred temperature range correlated to the polyolefin composition to be treated is highly effective in promoting the crystallization of polypropylene and propylene copolymers. Excellent dispersions may be obtained when separate components of the binary crystallization promoter are blended separately into the polypropylene or other polyolefin.

In addition to polyolefinic compositions thus treated having excellent transparency, such nucleated compositions exhibit outstanding physical properties and excellent color. The alkoxides and the acids of this invention, unlike the metal salts referred to in the prior art, are readily dispersed in the polyolefin by means of conventional techniques to give substantially homogeneous blends and can be used in high concentrations without pigmentation. In addition, the new crystallization promoter combinations of this invention are much more effective than the prior art heterogeneous nucleating agents in providing polyolefins with improved mechanical properties and transparency.

As may be observed from a study of the prior art, prior art nucleating agents are crystalline, high melting solids which usually promote heterogeneous nucleation through epitaxy. Epitaxy is the oriented growth of one crystalline substance on a substrate of a different crystalline substance. Hence, in order to be effective, the prior art nucleating agents had to be infusible or had to crystallize at a temperature well above the crystallization temperature of the polymer to be nucleated. In contrast thereto, the crystallization promoter combinations of this invention crystallize at temperatures below the melting point of the polyolefins in which they are effectively incorporated.

The alkoxides particularly useful in the practice of this invention are ones which would be fusible at least at the processing temperature of the polymer in question and may be represented by the following general structural formulas:

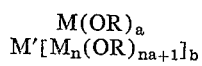

Since non-fusible metal alkoxides may also be represented by these formulas, the specification of fusibility as above set forth at processing temperatures is significant. In our fusible alkoxides M represents a metal with a valance of $a$, which can have values from 1 to 6 and M' represents a metal with a valence of $b$, which can have a value of 1, 2 or 3; R represents an alkyl or an aralkyl group containing 1–12 carbon atoms and $n$ is 1, 2, or 3.

The carboxylic acids useful in the crystallization promoters of this invention are qualified by three aspects:

(1) They preferably exhibit a nematic mesophase below the melting point of the polyolefin;
(2) They should be compatible with the polyolefin (that is, they do not of themselves deleteriously affect the clarity of the plastic); and
(3) They should be reasonably stable at the processing temperatures of the polyolefin.

Our preferred acids may be represented by the following general formulas which are intended to illustrate and do not necessarily represent all the acids which may be used:

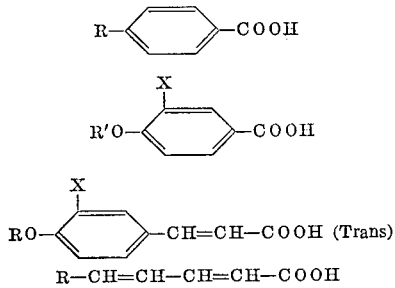

R—CH=CH—CH=CH—COOH

In the above formulas R represents an alkyl or aralkyl group of 1 to 12 carbon atoms and R' represents an alkyl group containing 3 to 12 carbon carbons atoms, and X represents hydrogen or halogen.

In further detail some of the alkoxides and double alkoxides and acids which are useful in the practice of this invention are:

Alkoxides $Al(OC_3H_7)_3$
$Mg(OC_4H_9)_2$
$Ca(OC_6H_{13})_2$
$Zn(OC_4H_9)_2$
$Ti(OC_3H_7)_4$
$Zr(OC_4H_9)_4$
$Cr[OC(CH_3)_3]_4$
$V(OC_3H_7)_4$
$VO(OC_2H_5)_3$
$Na[Zr_2(OC_3H_7)_9]$
$Mg[Al(OC_2H_5)_4]_2$

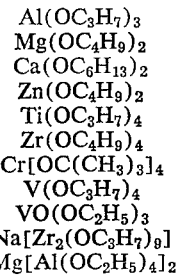

$Zn[B(OC_5H_{11})_4]_2$

Acids

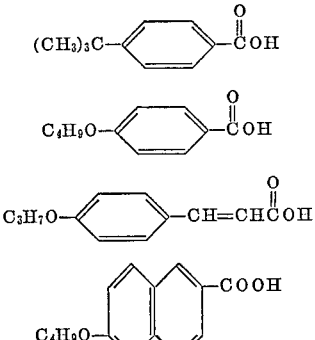

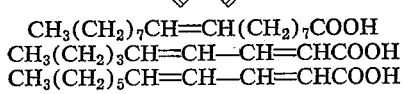

$CH_3(CH_2)_7CH=CH(CH_2)_7COOH$
$CH_3(CH_2)_3CH=CH—CH=CHCOOH$
$CH_3(CH_2)_5CH=CH—CH=CHCOOH$

The alkoxide-acid crystallization promoters of this invention are especially useful for improving the properties of polypropylene and the crystallizable copolymers of propylene with ethylene and with other alpha-olefins. In general, however, crystallizable polymers and copolymers of alpha-olefins containing from 2 to 10 carbon atoms can be used. Some examples are polypropylene, ethylene/propylene block copolymers, polybutenes-1, propylene/butene-1 copolymers, propylene/hexene-1 copolymers, propylene/docene-1 copolymers and poly-4-methyl-pentene-1.

The molar ratio of acid to alkoxide can be from 1:10 to 20:1, but preferably the ratio is from 1:1 to 10:1. The total concentration of the two components can be 0.05 to 10 percent, although in some instances lower and higher concentrations may be used. However, the preferred concentration range is 0.1 to 2.0 percent.

The alkoxide and acid combination may be incorporated in a number of ways into the polymer. However, preferably the alkoxide is blended first, then the acid is added. Excellent results can be obtained by molding a mixture of polymer which contains only the alkoxide with a polymer which contains only the acid. In this method the polymer pellets are thoroughly mixed before molding. Also, at least some mixing takes place in the molding machine. The crystallization promoters of this invention can be blended into the polymers batchwise or continuously, using hot rolls, Banbury mixers, or compounding extruders.

Since the alkoxides and acids of this invention are dispersed in a molten state into the molten polymer as already indicated, they should also be compatible with the molten polymer at least to the extent of the concentrations being employed. In addition to having a relatively low melting point, the acids should be capable of exhibiting a nematic mesophase as already mentioned.

The alpha-olefin polymers used in the practice of this invention may have any desired molecular weight ranging from materials having inherent viscosities (in tetralin at 145° C.) of 5.0 and above to 0.1 and below. Completely random alpha-olefin copolymers and atactic homopolymers which do not crystallize are to be avoided in the practice of this invention.

A further understanding of our invention will be had from a consideration of the following examples:

EXAMPLE I

Polypropylene (100 g.) having an inherent viscosity (in tetralin at 145° C.) of 1.8 and a conditioned density of 0.909 was blended on hot rolls with 0.2 g. of aluminum isopropoxide, then with 0.4 g. of p-tert-butylbenzoic acid. The resulting homogeneous blend was compression molded into a sheet 60 mils thick. The transparency of the sheet was measured with a Brice-Phoenix photometer (resolution of 10 minutes). The measure of transparency was taken as the ratio of light transmitted at zero degrees with reference to the incident beam $I_0$ (monochromatic light at 546 m$\mu$) to that transmitted at one degree, $I_1°$, higher values of the intensity ratio $I_0/I_1$ indicating better transparency. In addition, a sample of the above blend was injection molded for the measurement of mechanical properties. The following table shows the outstanding transparency and mechanical properties possessed by the treated polypropylene (A) in comparison with a similar sample of untreated polypropylene (B) and a sample treated with a 1% concentration of prior art nucleating agent aluminum tri-p-tert-butylbenzoate (C).

| Property/Units | Test Method | Polymer A | Polymer B | Polymer C |
|---|---|---|---|---|
| Transparency | $I_0/I_1$ | 15.6 | 1.09 | 1.85 |
| Crystallization temp./° C | DTA | 144 | 124 | 136 |
| Heat distortion temp./° C | | 160 | 154 | 154 |
| Tensile yield/p.s.i. | ASTM D-638 | 6,300 | 5,500 | 5,600 |
| Stiffness/p.s.i. | ASTM D-747 | 200,000 | 140,000 | 160,000 |
| Hardness, Rockwell R/scale | ASTM D-785 | 103 | 83 | 99 |
| Izod impact, notched, 23° C./ft.-lb./in. of notch | ASTM 256 | 0.8 | 0.7 | 0.5 |

Results similar to those in colum (A) were obtained when 0.4 g. of titanium (IV) isopropoxide and 0.5 g. of p-n-butoxybenzoic acid were used. All attempts to prepare completely homogeneous blends of aluminum salts of substituted benzoic acids were unsuccessful—particles were usually visible and the polymer appeared pigmented or smoky.

EXAMPLE II

A 270 g. sample of a copolymer containing 94% propylene and 6% ethylene and having an inherent viscosity of 1.75 was blended in a Banbury mixer with 1.3 g. of zirconium (IV) butoxide, then with 3.4 g. of p-n-hexylbenzoic acid. A small (1.5 in.) disk that was compression molded from this blend had an intensity ratio, $I_0/I_1=5.3$, compared with a control value of 1.24. When vanadium tetrabutoxide $V(OC_4H_9)_4$, was used with p-n-propoxybenzoic acid, similar results were obtained, except that the polymer was homogeneously colored a royal blue.

EXAMPLE III

The pronounced tendency of high-density polyethylene moldings to warp is well known. Thus it is necessary, particularly in molding articles that feature broad, flat surfaces, to clamp the mold until crystallization is relatively complete. Another well-known characteristic of high-density polyethylene is its poor light transmission, even when in the form of relatively thin quenched film.

A 1000 g. sample of high-density (0.960) polyethylene having a melt index of 4 was blended on the hot rolls (160° C.) with 5.0 g. of p-tert-butylbenzoic acid, then with 2.0 g. of aluminum isopropoxide. A 10-mil film was molded at 200° C. for two minutes and quenched in water at 15° C. The intensity ratio $I_0/I_1$ of this film was 15.3. The intensity ratio of a 10-mil film of untreated polymer, molded in exactly the same manner as above, was 1.4.

In order to observe the effect of the additives on the tendency of the polymer to wrap, disks 4 inches in diameter were injection molded and allowed to age at room temperature for 48 hours. Disks were similarly molded from untreated polymer and aged. Only 16% of the disks containing the crystallization promoter were warped while 82% of the untreated disks were badly warped.

EXAMPLE IV

A 1000 g. sample of poly(4-methyl-1-pentene) having an I.V. of 1.5 was blended in a small extruder with 3.5 g. of sodium zirconium isopropoxide, $Na[Zr_2(OC_3H_7)_9]$, and then with 8.5 g. of p-methoxy-cinnamic acid. The extrudate was chopped and re-extruded through a single-hole jet to form a monofilament having essentially no spin draft. The monofilament was quenched in ice water during spinning and subsequently drafted 12 to 1 over a hot roll at 115° C., the properties of this monofilament at 80° C. are shown in the table below (I) and are compared with a similar monofilament (II) containing no crystallization promoter.

| Property | (I) | (II) |
|---|---|---|
| Denier | 29 | 20 |
| Tenacity, g./den | 1.37 | 0.7 |
| Elongation, percent | 54 | 57 |
| Elastic modulus, g./den | 15 | 7 |

EXAMPLE V

A 1000 g. sample of isotactic polybutene-1 having a melt index of 2.3 (190° C.; 2.16 kg.) and a melting point of 122° C. (DTA) was blended in a Banbury mixer with 10 g. of zinc boron amyloxide, $Zn[B(OC_5H_{11})_4]_2$ and then with 2.0 g. of nona-2,4-dienoic acid. The resulting blend was molded for physical properties. The results are shown below, compared with polybutene-1 containing no crystallization promoter.

| Property/Units | Test Method | Polybutene-1 | |
|---|---|---|---|
| | | Treated | Untreated |
| Hardness, Shore D | D Durometer | 68 | 63 |
| Tensile yield strength/p.s.i. | ASTM-D-638 | 11,600 | 9,900 |
| Stiffness/p.s.i. | ASTM-D-747 | 128,000 | 107,000 |
| Heat distortion temp./° C. | | 127 | 120 |

EXAMPLE VI

In accordance with this example several samples of polyallomer and polypropylene containing promoter combinations within the present invention were processed on larger scale, commercial size equipment. For comparison purposes similar processing was applied to commercial polypropylene molding compositions A, B, and C, which commercial compositions contained prior art nucleating agents. In further detail, the materials were each molded on an Impco injection molder Model HE-300-P12-48 using a dishpan mold and a lighter base mold. The dishpan provided specimens for evaluating the clarity of the materials and the lighter base provided a thick section for evaluating any sinks and voids of the materials.

The materials were molded at only one condition for each mold. It is recognized that sinks and voids can be reduced by utilizing optimum molding conditions but no attempt was made to change the molding conditions between materials. The conditions utilized represent reasonable molding conditions for these materials. Table II below sets forth these molding conditions.

Samples of Tenite polypropylene both treated and untreated were evaluated for heat stability. The presence of the crystallization promoter did not appear to affect the heat stability of the polypropylene.

Molding results are tabulated in Table I. In this evaluation, the pump time (the time during which the maximum injection pressure is being used) required to bottom the ram is presented as a measure of the moldability or flow properties of the samples.

TABLE I

| | | Flow Rate | Pump Time | Voids | Clarity |
|---|---|---|---|---|---|
| Tenite Polyallomer 5021 | Control | 1.7 | 1:40 | None | Poor. |
| | Treated | 2.1 | 1:50 | do | Very Good. |
| Tenite Polyallomer 5B21 | Control | 1.6 | 1:40 | Medium | Poor. |
| | Treated | 1.5 | 1:40 | None | Good. |
| Tenite Polypropylene 4221 | Control | 2.0 | 2:00 | Large | Poor. |
| | Treated | 2.1 | 1:30 | None | Very Good. |
| Tenite Polypropylene 4241 | Control | 12.0 | 1:50 | Large | Poor. |
| | Treated | 12.0 | 1:15 | None | Excellent. |
| Commercial A | Control | 3.3 | 1:25 | Small | Poor. |
| Do | Nucleated | 4.8 | 1:50 | do | Do. |
| Commercial B | Control | 12.0 | 1:15 | Medium | Do. |
| Do | Nucleated | 12.0 | 1:25 | None | Good. |
| Commercial C | Control | 4.8 | 1:25 | Large | Poor. |
| Do | Nucleated | 4.0 | 1:30 | Small | Good. |

TABLE II.—TYPICAL MOLDING CONDITIONS

| Mold | Dishpan | Lighter Base |
|---|---|---|
| Melter Rear, °F./°C. | 400 | 400 |
| Melter Center, °F./°C. | 450 | 450 |
| Melter Front, °F./°C. | 450 | 450 |
| Injector Rear, °F./°C. | 400 | 400 |
| Nozzle #1 | 100 | 160 |
| Nozzle Valve | 100 | 160 |
| Mold Temp., °F./°C. | 50 | 50 |
| Clamp Timer, sec | 15 | 36 |
| Injection Timer, sec | 12 | 12 |
| Pump Timer, sec | (1) | (1) |
| Gate Timer, sec | 9 | 9 |
| Total Cycle, sec | 36 | 57 |
| Injector Pressure | 1,000 | 1,000 |
| Melter Pressure | 1,000 | 1,000 |
| Dwell Pressure | 1,000 | 1,000 |

1 Variable.

The following conclusions may be drawn from these results:

(1) The presence of the crystallization promoters of this invention in the polypropylenes improves their flow properties as measured by pump time, but appears to have little effect on the flow properties of the polyallomers. The flow properties of the commercially available nucleated polypropylenes were not improved over those of the corresponding unnucleated materials.

(2) The crystallization promoters of this invention reduce the frequency and size of voids in thick molded articles.

(3) The crystallization promoters of this invention improve the see-through (long range) clarity of the materials.

(4) The crystallization promoters of this invention reduce sinks in thick molded articles.

(5) The heat stability of polypropylene is not impaired by the presence of the crystallization promoters of this invention.

EXAMPLE VII (A) The procedure of Example I above wos followed, except that the polymer was 100 g. of a blend of polymers having the following compositions:

| Polymer | I.V. | Density | Parts |
|---|---|---|---|
| Polypropylene | 1.8 | 0.909 | 90 |
| Polyethylene | 1.9 | 0.956 | 7 |
| Ethylene/propylene copolymer rubber | 2.5 | 0.88 | 3 |

In the polymer was blended first 0.22 g. of p-n-butoxybenzoic acid, then 0.28 g. of aluminum isobutoxide. The intensity ratio, $I_0/I_1$, of 60-mil sheets molded from this polymer was 7.1, compared with a valve of 1.6 for an untreated sample. Furthermore, the mechanical properties of the treated sample were improved as shown in the following:

| Property | Treated | Untreated |
|---|---|---|
| Hardness, Rockwell R-scale | 172 | 81 |
| Stiffness, p.s.i. | 172,000 | 134,000 |
| Heat distortion temperature, °C | 157 | 146 |

(B) The procedure of Example I was followed, using 100 g. of a blend consisting of 80 parts of polypropylene (I.V.—1.75) and 20 parts polyethylene (I.V.—1.82, density—0.957). This polymer blend was further blended, first, with 0.25 g. of 6-butoxy-2-naphthoic acid, then with 0.25 g. of magnesium n-hexyloxide. The intensity ratio, $I_0/I_1$, of a 60-mil sheet molded from this polymer was 4.2; the intensity ratio observed on a sheet of untreated polymer was 1.0. The crystallization promoter affected the crystallinity-dependent properties of the polypropylene-polyethylene blend as shown below:

| Property | Treated | Untreated |
|---|---|---|
| Hardness, Rockwell R-scale | 101 | 80 |
| Stiffness, p.s.i. | 163,000 | 128,000 |
| Heat distortion temperature, °C | 151 | 140 |

(C) In a Banbury mixer, 1000 g. of polypropylene having an inherent viscosity of 1.8 and conditioned density of 0.909 was blended first with a mixture of 2.82 g. of magnesium zirconium isopropoxide, $$MgZr_4(OC_3H_7)_{18}$$

and 1.43 g. of sodium zirconium isopropoxide, $NaZr_2(OC_3H_7)_9$, then with 0.75 g. of p-n-butoxybenzoic acid.

The intensity ratio, $I_0/I_1$, of a 60-mil thick sheet molded from this blend was 14.3 compared with 1.09 for the untreated polymer. Other effects of the additives are shown in the following:

| Property | Treated | Untreated |
|---|---|---|
| Crystallization temperature, °C | 142 | 124 |
| Heat distortion temperature, °C | 161 | 154 |
| Stiffness, p.s.i. | 187,000 | 140,000 |
| Hardness, Rockwell R-scale | 101 | 83 |

It is thought the improvement of our invention is clear from the several examples set forth above which are thought to emphasize our novel feature of the successively blending with a polyolefin melt the individual components of our new multi-component crystallization promoter system. However, to present the subject from a different approach set forth below is Example VIII. It will be noted from the example that without the successive blending the results obtained with this example were not as good as in the Examples I–VII.

EXAMPLE VIII

In a small glass test tube 0.2 g. of aluminum isopropoxide powder was thoroughly mixed with 0.4 g. of p-tert.-butylbenzoic acid. This mixture was then blended into 100 g. of polypropylene having an inherent viscosity of 1.8 and a conditioned density of 0.909. When this blend was used to compression mold a 60-mil sheet, the sheet contained numerous particles which were clearly visible to the naked eye and many more which were visible with a magnification of 20×. The transparency rating, $I_0/I_1$, was 1.67.

It may be seen from the above that our new combination agent of alkoxide-acid readily blends with polyolefin polymer either on a small or large scale. There are no or only minor problems of dispersion or lack of clarity in product as has been encountered in prior art systems. Accordingly, our invention lends itself to the following type applications:

(1) High-density polyethylene having reduced post-mold warpage and better dimensional stability.

(2) Polypropylene having improved clarity, higher stiffness, and higher heat distortion temperature.

(3) Poly(1-butene) having greater stiffness and hardness.

(4) Propylene/1-butene copolymers with greater rigidity and reduced tack.

(5) Low-viscosity propylene/1-butene copolymers having a reduced delayed tack time and giving less permeable coatings.

(6) Poly(4-methyl-1-pentene) fibers having improved high-temperature properties.

(7) Polyolefins, in general, having improved moldability (surface finish, uniform mold shrinkage, shorter mold cycle, better mold release) and processability (e.g., chill-roll release).

(8) Propylene/1-butene copolymer film having improved modulus.

In the above examples, the various polyolefins in several instances contained as stabilizers 0.1% concentration of dilauryl 3,3'-thiodipropionate and 0.1% 4,4'-butylidenebis(6-tert-butyl-m-cresol). However, other usually used stabilizers may be incorporated.

Although the invention has been described in detail with reference to preferred embodiments thereof, it will be understood that variations and modifications can be effected within the spirit and scope of the invention as described hereinabove and as defined by the appended claims.

We claim:

1. The process for regulating the crystal development of a polyolefinic composition susceptible of such regulation which comprises blending separately and successively with a melt of said composition the individual components of a multi-component crystallization promoter system comprising (1) one or more metal alkoxides fusible at the blending temperature applied to the polyolefinic composition being processed and (2) one or more organic acids which exhibit either lyotropic or thermotropic mesomorphism at a temperature at least below the melting point of said polyolefinic composition, and solidifying the resulting melt by cooling.

2. The process of claim 1 wherein the poly-alpha-olefinic composition has thoroughly dispersed therein an alkoxide-acid promoter combination which is compatible with said composition and which acid component exhibits a liquid crystalline state at a temperature at least below the melting point of said poly-alpha-olefinic composition, said combination being selected from the group consisting of those fusible alkoxides with a formula $M(OR)_a$ and $M'[M_n(OR)_{na+1}]_b$ wherein M represents a metal with a valence of $a$, which can have values from 1 to 6 and M' represents a metal with a valence of $b$, which can have a value of 1, 2, or 3 and the acid has the formulas from the groups,

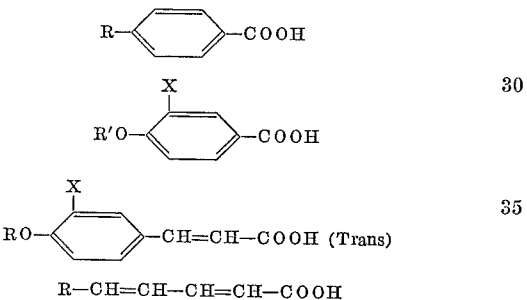

wherein R represents an alkyl or aralkyl group of 1 to 12 carbon atoms and R' represents an alkyl group containing 3 to 12 carbon atom, and X repreent hydrogen or halogen.

3. The process of claim 1 wherein the acid component exhibits a nematic mesophase below the melting point of the polyolefinic composition.

4. Crystallizable poly-alpha-olefinic composition having readily and thoroughly dispersed therein from about 0.05 to about 10.0% by weight of a fusible alkoxide-acid combination crystallization promoter as set forth in claim 2 which is compatible with said composition and which acid component exhibits a liquid crystalline state at a temperature below the melting point of said poly-alpha-composition.

5. The composition of claim 4 wherein the polyolefinic composition substantially completely consists of polypropylene having thoroughly dispersed therein a crystallization promoter which is readily compatible with said polypropylene and essentially comprising a fusible metal alkoxide and an organic acid which exhibits a liquid crystalline state at a temperature at least below the melting point of said polypropylene, the resultant polypropylene having enhanced clarity and improved mechanical properties.

6. An intermediate combination of at least one metal alkoxide and at least one acid useful as a crystallization promoter in polyolefinic compositions, said combination being further characterized in that the alkoxide is from the group consisting of:

$Al(OC_3H_7)_3$
$Mg(OC_4H_9)_2$
$Ca(OC_6H_{13})_2$
$Zn(OC_4H_9)_2$
$Ti(OC_3H_7)_4$
$Zr(OC_4H_9)_4$
$Cr[OC(CH_3)_3]_4$
$V(OC_3H_7)_4$
$VO(OC_2H_5)_3$
$Na[Zr_2(OC_3H_7)_9]$
$Mg[Al(OC_2H_5)_4]_2$

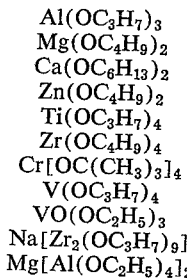

$Zn[B(OC_5H_{11})_4]_2$ and the acid is from the group consisting of

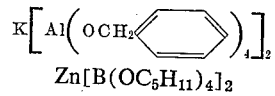

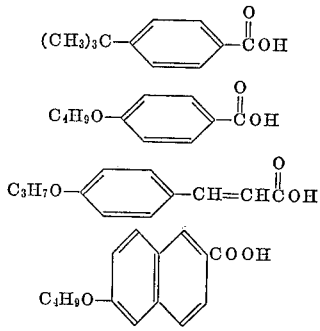

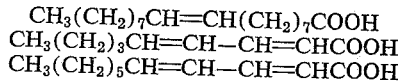

$CH_3(CH_2)_7CH=CH(CH_2)_7COOH$
$CH_3(CH_2)_3CH=CH-CH=CHCOOH$
$CH_3(CH_2)_5CH=CH-CH=CHCOOH$

References Cited

UNITED STATES PATENTS 3,207,735   9/1965   Wijga.

JOSEPH L. SCHOFER, *Primary Examiner.*

L. EDELMAN, *Assistant Examiner.*

U.S. Cl. X.R.

260—88.2, 94.9, 878